United States Patent

[11] 3,600,701

[72] Inventor Hugh W. Gouldthorpe
    Cazenovia, N.Y.
[21] Appl. No. 713,053
[22] Filed Mar. 14, 1968
[45] Patented Aug. 17, 1971
[73] Assignee General Electric Company

[54] SIGNAL GENERATOR FOR PRODUCING A SET OF SIGNALS AT BASEBAND FREQUENCY AND WITH ADJUSTABLE PHASE SLOPE
5 Claims, 2 Drawing Figs.

[52] U.S. Cl. .................................................... 331/45,
    331/38, 343/100 SA
[51] Int. Cl. .................................................... H03b 27/00
[50] Field of Search .................................................. 343/100.6;
    331/38, 45

[56] References Cited
UNITED STATES PATENTS 3,005,960 10/1961 Levenson ..................... 331/38
3,090,928 5/1963 Welty ............................ 331/38

Primary Examiner—Rodney D. Bennett, Jr.
Assistant Examiner—Richard E. Berger
Attorneys—Carl W. Baker, Melvin M. Goldenberg, Frank L. Neuhauser and Oscar B. Waddell ABSTRACT: This disclosure describes a signal generator for producing a family of signals of common frequency and of uniformly stepped phase progression with the rate of progression or phase slope adjustable. Signal sets of this character find application for control of beam direction in electronically steered array radiators of radar, sonar and communications systems, and in frequency selective filters of the kind tunable to scan through a band of frequencies. The signal generator as described comprises a reference harmonic spectrum generator and a steering harmonic generator provided with basic frequency inputs of common frequency value but with a phase difference made adjustable as by coupling one such input through an adjustable phase shifter. Each harmonic of the spectrum produced by one generator is mixed with a harmonic of different order from the other generator to provide a group of signals all of common frequency, corresponding to the difference in order of the two harmonics from which each is derived, and with each of the signals phase-displaced from the next by a phase difference equal to the phase shift introduced through the input phase shifter and adjustable thereby. These signals then are again mixed with steering signals and output sidebands selected to yield the desired set of output signals all of common frequency and of phase slope dependent upon the setting the adjustable phase shifter.

3,600,701

SIGNAL GENERATOR FOR PRODUCING A SET OF SIGNALS AT BASEBAND FREQUENCY AND WITH ADJUSTABLE PHASE SLOPE

FIELD OF THE INVENTION

The invention herein described was made in the course of or under a contract, or subcontract thereunder, with the Department of the Army.

This invention relates generally to electrical signal generators and more specifically to such generators adapted to produce a family of output signals all of common frequency and of controlled phase slope. Still more specifically, the invention relates to such generators capable of producing a set of signals of common frequency and of uniformly stepped phase progression with the magnitude of phase displacement between each two adjacent signals of the set being adjustable to thus control the phase slope across the set, and if desired with control also of relative amplitudes of the signals of the set.

Families of signals having the general character just described find application in phase steering of transmit and receive beams of electronically steered antenna arrays as used in microwave communications and radar systems, in other array radiators such as transmitting and receiving transducer arrays in sonar and underwater communications systems, and in frequency selective filters of the kind requiring adjustability of filter response characteristic to enable scanning of a frequency band. The signal generators of this invention afford particular advantage in the array radiator application because the control they afford of signal amplitudes allows precise and convenient adjustment of beam width and shape as well as of beam pointing angle. They afford particular advantage also in array radiators in which the beam must be steered in two directions, as in planar arrays, with which they permit significant system simplification and reduction of the number of required components as will be explained hereinafter.

DESCRIPTION OF THE PRIOR ART

The present invention constitutes a variant of the signal generator described and claimed in the copending application of Major A. Johnson, Ser. No. 713,217, filed on even date and of common assignee herewith, now U.S. Pat. No. 3,500,303. The signal generators of the Johnson application for patent employ two-sided spectra centered on a suitable carrier signal, which normally entails use of relatively high frequencies. While such higher frequencies present no problem in many applications and may be advantageous in some, in other applications and particularly those in which it is desired to use solid state components there may be considerable advantage in use of relatively lower frequencies.

The present invention has as its principal objective the provision of signal generators which require only such relatively lower frequencies, and thus permit more economic design and afford higher reliability with solid state components best adapted to operation at these lower frequencies. More specifically still, the signal generators of this invention employ directly the harmonic spectra of the reference and steering harmonic spectrum generators in a baseband system, affording significant economic advantage due to the additional power available from baseband spectra and the lower frequencies at which amplification and other signal processing is performed.

SUMMARY OF THE INVENTION

In its preferred embodiment the invention comprises a reference harmonic spectrum generator and a steering harmonic spectrum generator, the two generators having a common input from a local oscillator of suitable frequency, but with one such input being routed through an adjustable phase shifter. Each of the spectrum generators comprises a pulse generator and one preferably includes means for controlling pulse width, for purposes of control of the relative amplitude of the spectral lines of at least one of the two output spectra. Each of some selected plurality of the harmonics from one output spectrum is paired with a harmonic from the other spectrum of numeric order offset from its own by an integer which is the same for all the output harmonics thus paired. The paired harmonics are combined in a first mixer bank to produce a corresponding plurality of signals all of like frequency, corresponding to the product of the input frequency times the integer by which the paired harmonics are offset, and of phase angle proportioned to the phase displacement introduced by the phase shifter in the input to one generator times the order of the particular harmonic from that generator which is included in the pair. These signals then are heterodyned in a second mixer bank with signals of frequency such that the mixer output sidebands include a set of signals all at common frequency but with phase progression across the set at a rate controlled by the input phase shifter. In an alternative embodiment of the invention also described, different sidebands from the second mixer bank are employed to generate both sum and difference signals from the same harmonic, thus yielding significant system simplification.

BRIEF DESCRIPTION OF THE DRAWINGS

The foregoing and other features and advantages of the invention will be more fully understood by reference to the following detailed description when read in conjunction with the accompanying drawings, wherein.

DESCRIPTION OF PREFERRED EMBODIMENTS

Figure 1:
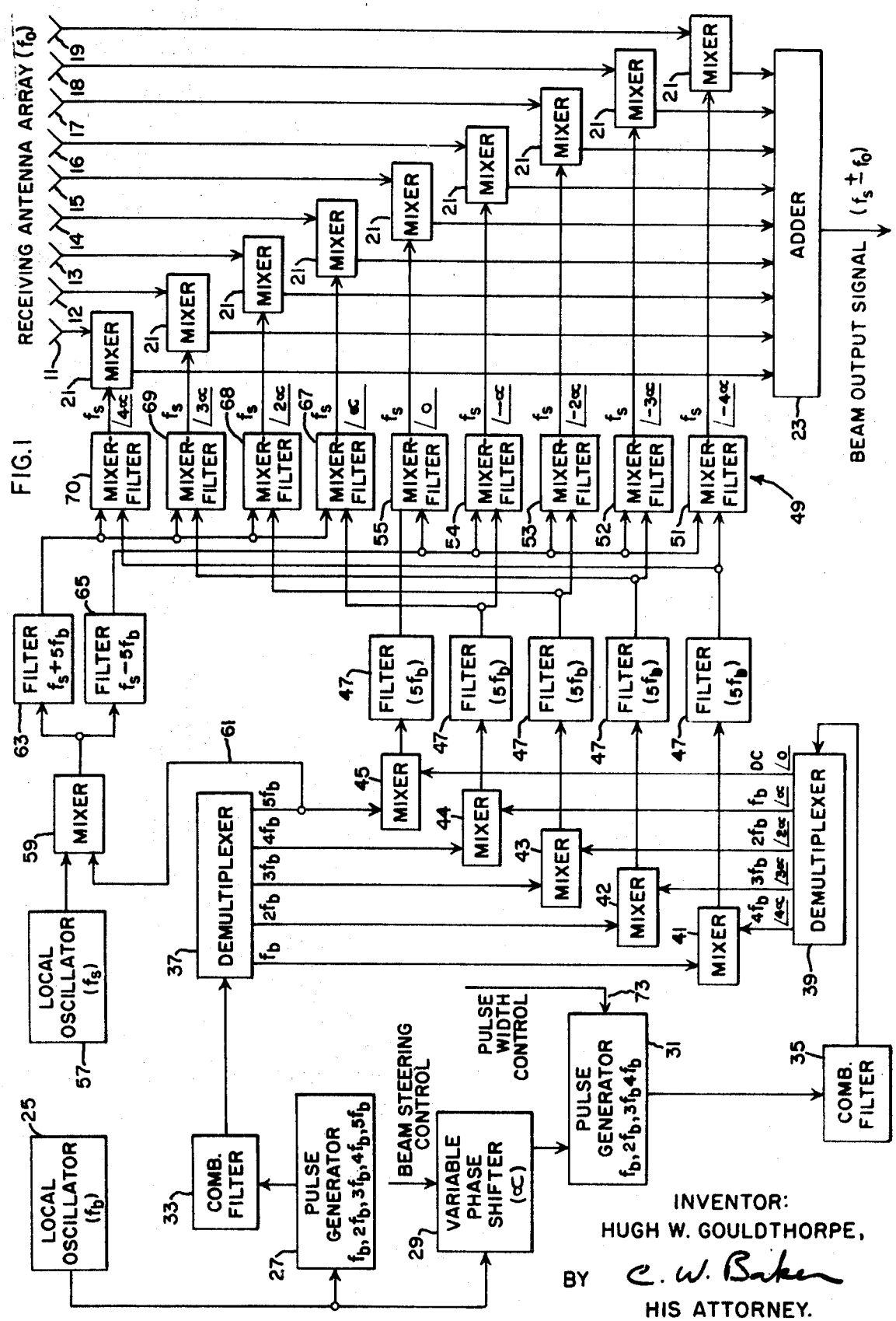
FIG. 1 is a block diagram of the signal generator of the present invention as applied to a microwave system including a phase steered array antenna.

With continued reference to the drawings, wherein like reference numerals have been used throughout to designate like elements, FIG. 1 illustrates one preferred embodiment of the signal generator of this invention as incorporated in a microwave radar or communications system of the kind using a phase steered array antenna for electronic beam forming and steering. The antenna comprises a plurality of dipole of other receptor elements 11—19 ordered in a linear array disposed symmetrically about the center receptor element 15 as illustrated.

The received signal at frequency $f_o$ sensed by each of the receptor elements 11—19 constitutes one input to one of a bank of mixers 21 each having as its second input one of a set of steering signals all at common frequency $f_s$ and with linearly stepped phase angle, the phase difference between each two adjacent signals being plus or minus $\alpha$ as indicated. Each of these steering signals is heterodyned with one of the received signals to produce a family of signals of common frequency $(f_o \pm f_s)$ which are summed in an adder 23 to provide a beam output signal $E\Sigma$. Such additive summation will occur, however, only for one direction of signal incidence upon the array face, this being the angle at which the phase progression of the received signal along the length of the array corresponds to the phase progression across the set of steering signals. Thus the phase slope of the steering signal set supplied to the mixers 21 controls the direction of the transmitted or received beam, the mechanism by which this is accomplished being explained in greater detail in the aforementioned copending application of Major A. Johnson.

The steering signal generator of the present invention provides the desired set of steering signals of variable phase slope at relatively low frequencies facilitating implementation with transistors and other solid state elements. As shown, a local oscillator 25 operative at some suitable frequency $f_b$ transmits a signal of that frequency directly to a first pulse generator 27 and, through an adjustable phase shifter 29, also to a second pulse generator 31. These pulse generators may be essentially identical in construction and performance, and each operates to produce a spectrum of harmonic frequencies each representing some integral multiple of the input or basic frequency $f_b$.

The harmonic spectra produced by pulse generators 27 and 31 are transmitted through comb filters 33 and 35, respectively, to one of two demultiplexers 37 and 39, respectively. The comb filters pass only frequencies corresponding to harmonics of the basic frequency $f_b$, so the inputs to the demultiplexers each comprise a family of harmonics of frequencies $f_b$, $2f_b$ ...$nf_b$. The signals into demultiplexer 39 are displaced in phase from the corresponding signals into demultiplexer 37, however, by the product of the phase shift ($\alpha$) introduced by phase shifter 29 times the numeric order of each individual harmonic. This phase difference may readily and precisely be controlled by adjustment of the phase shifter 29 which is interposed in the input to the steering harmonic signal generator comprising pulse generator 31, comb filter 35 and demultiplexer 39.

The demultiplexers separate their respective input signals by numeric order of the $f_b$ harmonic content, and transmit signals corresponding to some selected plurality of harmonic orders to a first series or bank of mixers 41—45. The signals paired into these mixers have the respective frequencies and phase angles indicated, and as is apparent the harmonic orders of the signals of each pair are of inversely related order. That is, each of the signals from demultiplexer 39 of increasingly higher harmonic order is paired with a signal from demultiplexer 37 of correspondingly lower order, so that the sum signal outputs from the mixers 41—45 all are of like frequency equal to a selected multiple of the basic frequency $f_b$, the multiple being five in this example. These output signals are of unlike phase angle, however, due to the phase displacement of each of the signals from the reference spectrum generator as compared to those from the steering spectrum generator.

The mixer outputs are filtered to remove the difference signal and other unwanted signal content in a bank of identical narrow band filters 47 all tuned to the mixer sum frequency ($5f_b$ in this example). Each signal then is split to provide inputs to two mixers in a second mixer bank designated generally by reference numeral 49. Half the mixers of this bank, including mixers 51—55, have as their second input the lower sideband or difference frequency $f_s-5f_b$ from a steering signal generator comprising a local oscillator 57, a mixer 59 having as its two inputs the $f_s$ signal from local oscillator 57 and a signal of frequency $5f_b$ which may conveniently be derived from demultiplexer 37 as shown at 61, and upper and lower sideband filters 63 and 65, respectively. The remaining four mixers of the mixer bank 49, have supplied to them the upper sideband signal, at frequency $f_s+5f_b$, from filter 63. Each of the mixers 51—55 and 67—70 incorporates or is followed by a narrow band filter tuned to the steering frequency $f_s$ so as to pass the sum frequency output of mixers 51—55 and the difference frequency output of mixers 67—70. All the outputs then are at the steering frequency $f_s$ but each has a different phase angle centered about the zero value for the signal output of mixer 51, and of positive or negative sign as indicated. Each of these signals combines in one of the mixers 21 with one of the received signals from the array radiator elements 11—19, and the mixer outputs then are summed in the adder 23 to produce the desired beam output signal at frequency $f_a \pm f_o$ as previously described.

The desired control of beam direction is, as also previously noted, obtained by variation of the phase slope across the output signal set. In the invention as illustrated in FIG. 1 this phase slope adjustment is introduced by the BEAM STEERING CONTROL which is applied to the phase shifter 29, an which controls the magnitude of phase shift ($\alpha$). Since adjustable phase shifters of excellent precision are achievable this arrangement affords accurate and convenient control of the output signal phase slope and thus of beam pointing direction.

For beam width control, one or both of the two pulse generators 27 and 31 may include a pulse width input as at 73 for varying the width of the pulse and thus controlling the amplitude distribution of the output harmonic spectrum. As more fully explained in the aforementioned copending application of Major A. Johnson, the spectral lines corresponding to different harmonic orders produced by a narrow pulse are of substantially constant amplitude whereas those produced by a wide pulse display a substantial amplitude taper or decrease with increasing harmonic order. By thus controlling the amplitudes of the harmonic spectral lines, precise and convenient control of beam width and shape may be obtained.

It will be noted that the signal content necessary for two steering signals is included in each of the outputs from the first bank of mixers 41—45, with each of the outputs being divided and sent to two mixers in the second bank of mixers 51—55 and 67—70. By using different sidebands in these second mixers, and more specifically by supplying half with the upper sideband signal $f_s+5f_b$ from filter 63 and the other half with the lower sideband signal $f_s-5f_b$ from filter 65, the steering signals for both the plus $n^{th}$ and minus $n^{th}$ element may be generated from each pair of harmonics from the spectrum generators. Therefore, only N harmonic lines, N first mixers 41—45, and N filters 47 and other signal processor elements are required for a transmitting or receiving transducer array of 2N+1 elements, thus yielding a significant reduction in number of required components and a corresponding reduction in system complexity and cost.

Figure 2:
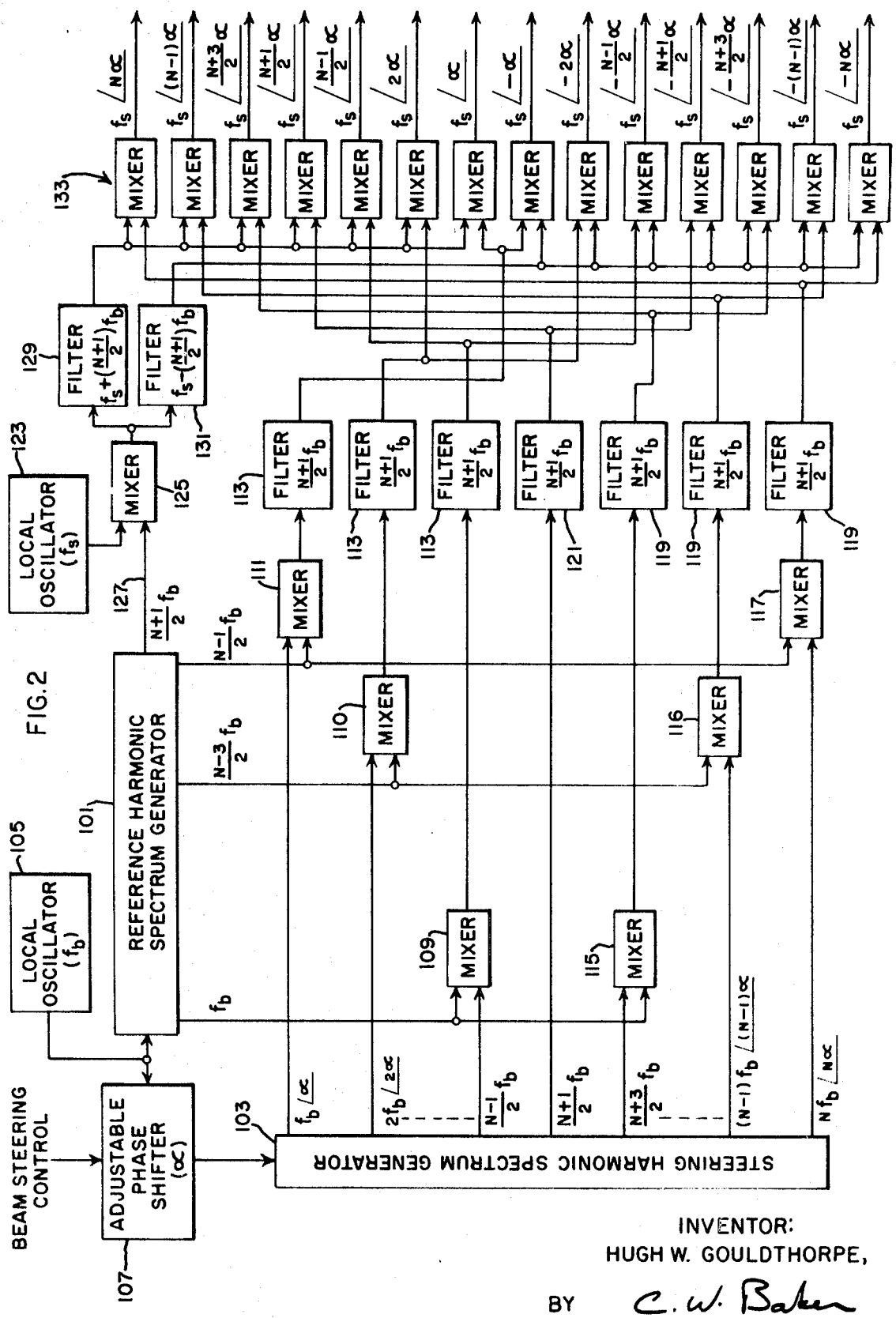
FIG. 2 is a block diagram of an alternative embodiment of signal generator in accordance with the invention.

The common frequency between mixing operations may be made equal to the difference of the reference and steering harmonics combined in mixers 41—45 or the sum of these frequencies as in the embodiment shown in FIG. 1. The difference frequency case allows a common frequency choice of any multiple of the basic frequency $f_s$, but of course higher frequency choices require generation of higher frequency reference signals. FIG. 2 illustrates an alternative embodiment of the invention which uses both the sum and the difference frequencies resulting from combination of each pair of harmonics in the first mixer bank. The common frequency choice then is arbitrary and the reference spectrum will need include only frequency terms in a lower frequency band. The choice of common frequency is made to minimize spurious signals in the mixing operations and to facilitate design for use of solid state devices for amplification and other signal processing purposes.

In FIG. 2 the reference harmonic spectrum generator 10 and steering harmonic spectrum generator 103 again are supplied from a local oscillator 105 with a common input at the basic frequency $f_b$, but with the $f_b$ signal input to one of the two spectrum generators being routed through an adjustable phase shifter 107 for beam steering control in the manner previously described with reference to the embodiment of FIG. 1. The harmonic signal outputs of the two generators are combined in a first mixer bank comprising mixers 109—111 which together with their associated narrow band filters 113 provide an upper sideband output at a frequency equal to the sum of the two harmonics which constitute the inputs to each of the mixers. The other three mixers 115—117 are each paired with one of the mixers 109—11 with the members of such pair having one common input from the reference generator 101, mixers 109 and 115 having a common input at frequency $f_b$ for example, and each of the mixers 115—117 has as its other input a steering signal from generator 103 of the particular harmonic order indicated in FIG. 2. The mixers are followed by narrow band filters 119 which pass only the lower sideband or difference frequency signals, thus outputting signals at the same $N+1/2_b$ frequency as the upper sideband output of mixers 109—111. One of the harmonics from the steering spectrum generator 103, namely that at $N+1/2f_b$, is transmitted directly and without combination with any of the harmonics from the other generator through a narrow band filter 121 having its passband centered on the same frequency $N+1/2f_b$ as the filters 113 and 119.

The steering frequency $f_s$ generated by local oscillator 123 combines in mixer 125 with a signal at frequency $N+1/2f_b$, which is transmitted on line 127 from the reference harmonic spectrum generator 101, to again yield upper and lower sideband signals which after separation in filters 129 and 131 are transmitted each to one-half of the second mixer bank designated generally by reference numeral 133. Each combines there with the signal from one of the filter elements 113, 119 and 121, each of these latter signals being divided to feed one mixer in each half of the bank.

The operation of the mixers here is such as to derive the upper sideband or sum frequency output in all those mixers which have as their two inputs the $f_s-N+1/2f_b$ signal from filter 131 and the $N+1/2f_b$ signals from filters 113, 119 or 121, and to derive the lower sideband or difference frequency output in all those mixers which have as their two inputs the $f_s+N+1/2f_b$ signal from filter 129 and the $N+1/2f_b$ signals from filters 113, 119 and 121. This yields a set of signals all at common frequency, the steering signal frequency $f_s$, and with linearly stepped phase progression in both positive and negative direction. A zero phase angle signal would normally also be provided, in essentially the same manner as in the system of FIG. 1.

Thus the steering signal output comprises two sets of N lines with constant phase displacement between each two adjacent lines of the set and with the phase values of corresponding lines of the two sets being of equal magnitude but opposite sign. When applied to a steerable array like that shown in FIG. 1 these signals may be used to control the steering of the array in the manner previously described, but with significant reduction in number of required components due to use of both the sum and the difference frequency terms out of the first mixers.

In the systems as described in the foregoing there is provided a single beam output. It is also possible to produce a number of independently steered beams by multiplexing a plurality of the beam steering signal generators of this invention in the same manner as described in the aforementioned copending application of Major A. Johnson. Other modifications of the signal generators of this invention will occur to those skilled in the art and it therefore should be understood that while in this description of the invention only certain presently preferred embodiments have been illustrated and described by way of example, the appended claims are intended to cover all such modifications as fall within the true spirit and scope of the invention.

What I claim as new and desired to be secured by Letters Patent of the United States is:

1. A signal generator for producing a set of signals of common frequency and of variable phase slope, comprising:
   a. first and second signal sources providing signal output at first and second frequencies, respectively;
   b. a first harmonic spectrum generator connected to said first signal source and responsive thereto to produce a reference harmonic signal spectrum comprising a plurality of signals of harmonically related frequencies and of common phase angle;
   c. phase shifting means adjustable to vary the magnitude of signal phase shift effected thereby;
   d. a second harmonic spectrum generator connected through said phase shifting means to said first signal source and responsive thereto to produce a steering harmonic signal spectrum comprising a plurality of signals of harmonically related frequencies and of phase relation such as to provide between the signals of each two adjacent harmonics a phase difference of magnitude equal to the phase shift effected by said phase shifting means;
   e. first mixer means comprising a plurality of mixers each having transmitted thereto a signal of one harmonic order from said first spectrum generator and a signal of different harmonic order from said second spectrum generator, the two harmonics thus transmitted to said mixer means being of frequencies such that each mixer provides an output at a common frequency equal to a selected multiple of the frequency of said first signal source;
   f. second mixer means having as one input thereto the signal output of said second signal source and having as another input thereto a signal of said common frequency; and
   g. third mixer means including a plurality of mixers each having transmitted thereto an output of said second mixer means and an output of one of the mixers of said first mixer means, and operative to produce a set of output signals all of said second signal frequency and of phase slope determined by the adjustment of said phase shifting means.

2. A signal generator as defined in claim 1 wherein:
   a. the mixers of said third mixer means are arranged in paired relation;
   b. wherein means are provided for separating the upper and lower sidebands in the signal output of said second mixer means and transmitting the upper sideband to one mixer of each such pair and the lower sideband to the other; and
   c. wherein means are provided for selecting the sum frequency output from the mixer of each pair having said lower sideband input and the difference frequency output from the other, so as to output from each mixer pair two signals with like frequency and with phase angles of like value but opposite sign.

3. A signal generator as defined in claim 1 wherein the harmonics transmitted from said spectrum generators to the mixers of said first mixer means are of inversely related harmonic orders whereby the mixer sum frequency outputs all are of like frequency value.

4. A signal generator as defined in claim 1 wherein the mixers of said first mixer means are arranged in paired relation, an wherein the mixers of each such pair receive from one of said spectrum generators one signal input of the same harmonic order and receive from the other of said spectrum generators two signal inputs of different harmonic orders such that the sum frequency output generated from the one equals the difference frequency output generated from the other and both such outputs are of said common frequency.

5. A signal generator for producing a set of signals of common frequency and of uniformly stepped phase progression, comprising:
   a. means for generating a first spectrum of signals of harmonically related frequencies and with phase angles stepped proportionally to the harmonic order of each of the signals;
   b. means for generating a second signal spectrum including signals of the same harmonic orders as in said first spectrum but with all signals of common phase angle;
   c. means for mixing each of a plurality of the signals of one of said spectra with a signal of different harmonic order from the other thereof to produce a plurality of signals all of common frequency determined by the difference in harmonic orders of the signals from which each derives and each of phase angle corresponding to the phase angle of the harmonic of said first spectrum from which it derived;
   d. a steering signal source providing a steering signal of frequency offset from said common frequency; and
   e. means for mixing said steering signal with each of said signals of common frequency to yield a set of signals all of said offset frequency and of uniformly stepped phase progression.